US012335705B2

(12) United States Patent
Tong et al.

(10) Patent No.: US 12,335,705 B2
(45) Date of Patent: Jun. 17, 2025

(54) SPEAKER

(71) Applicant: AAC Microtech (Changzhou) Co., Ltd., Changzhou (CN)

(72) Inventors: Dijiang Tong, Shenzhen (CN); Huanbin Liao, Shenzhen (CN); Yajian Zheng, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 214 days.

(21) Appl. No.: 18/090,443

(22) Filed: Dec. 28, 2022

(65) Prior Publication Data

US 2024/0056738 A1 Feb. 15, 2024

Related U.S. Application Data

(63) Continuation of application No. PCT/CN2022/125111, filed on Oct. 13, 2022.

(30) Foreign Application Priority Data

Aug. 12, 2022 (CN) ......................... 202222132717.4

(51) Int. Cl.

| | |
|---|---|
| ***H04R 25/00*** | (2006.01) |
| ***H04R 1/28*** | (2006.01) |
| ***H04R 7/12*** | (2006.01) |
| ***H04R 9/02*** | (2006.01) |
| ***H04R 9/04*** | (2006.01) |
| ***H04R 9/06*** | (2006.01) |

(52) U.S. Cl.

CPC ........... *H04R 7/127* (2013.01); *H04R 1/2811* (2013.01); *H04R 9/025* (2013.01); *H04R 9/046* (2013.01); *H04R 9/06* (2013.01); *H04R 2207/00* (2013.01); *H04R 2499/11* (2013.01)

(58) Field of Classification Search

CPC .............. H04R 1/2811; H04R 2207/00; H04R 2499/11; H04R 7/127; H04R 9/025; H04R 9/046; H04R 9/06; H04R 31/003; H04R 7/20

USPC ........................................................... 381/430

See application file for complete search history.

(56) References Cited

U.S. PATENT DOCUMENTS

| | | | | |
|---|---|---|---|---|
| 2017/0013379 | A1* | 1/2017 | Zhang | H04R 9/025 |
| 2017/0048622 | A1* | 2/2017 | Wu | H04R 9/043 |
| 2020/0045460 | A1* | 2/2020 | Xiao | H04R 7/18 |
| 2020/0053476 | A1* | 2/2020 | Xiao | H04R 9/025 |
| 2021/0112332 | A1* | 4/2021 | Meng | H04R 9/025 |
| 2023/0029866 | A1* | 2/2023 | Ren | H04R 9/025 |
| 2024/0056738 | A1* | 2/2024 | Tong | H04R 9/025 |
| 2024/0073619 | A1* | 2/2024 | Liu | H04R 1/025 |

* cited by examiner

*Primary Examiner* — Phylesha Dabney

(74) *Attorney, Agent, or Firm* — Wiersch Law Group

(57) ABSTRACT

A speaker includes: a frame, a vibration system fixed to the frame, including a diaphragm fixed to the frame and a voice coil driving the diaphragm to vibrate and emit sounds, and a magnetic circuit system fixed to the frame, wherein the diaphragm includes a dome and a suspension surrounding and connected with the dome, the dome includes a first metal dome with a through hole and a second dome covering the through hole, the first metal dome is located between the suspension and the second dome, and the first metal dome is fixedly connected with the suspension and the second dome. Compared with the related art, the speaker disclosed by the present disclosure has higher high frequency performance.

9 Claims, 4 Drawing Sheets

SPEAKER

TECHNICAL FIELD

The present disclosure relates to an electro-acoustic device, in particular to a speaker used in portable electronic products.

BACKGROUND

Speakers, also known as loudspeakers, are used in loudspeaker boxes to achieve the conversion of audio signals into sound playback.

A related speaker usually includes a frame, and a vibration system and a magnetic circuit system fixed to the frame. The vibration system includes a diaphragm and a voice coil driving the diaphragm to vibrate and emit sounds. The diaphragm includes a dome and a suspension, there is only one dome which is made of a single material, the dome with this structure is difficult to meet the needs of thickness, rigidity, molding, heat dissipation, high frequency performance at the same time.

Therefore, it is a need to provide an improved speaker to solve the above problems.

SUMMARY

In view of the above, an objective of the present disclosure is to provide a speaker with higher high frequency performance.

In order to achieve the objective mentioned above, the present disclosure discloses a speaker including: a frame, a vibration system fixed to the frame, comprising a diaphragm fixed to the frame and a voice coil driving the diaphragm to vibrate and emit sounds, and a magnetic circuit system fixed to the frame, wherein the diaphragm comprises a dome and a suspension surrounding and connected with the dome, the dome comprises a first metal dome with a through hole and a second dome covering the through hole, the first metal dome is located between the suspension and the second dome, and the first metal dome is fixedly connected with the suspension and the second dome.

As an improvement, the first metal dome comprises a main portion, a first fixing portion connected with the second dome and a second fixing portion connected with the suspension, the main portion is arranged between the first fixing portion and the second fixing portion, the second dome comprises a body portion and a groove recessed from an outer edge of the body portion toward the magnetic circuit system, the body portion is arranged in the through hole, a lower surface of the first fixing portion is fixedly connected with the groove.

As an improvement, an upper surface of the first fixing portion is flush with an upper surface of the body portion.

As an improvement, the suspension comprises an arcuate portion, a first connecting portion extending inwardly from one end of the arcuate portion, and a second connecting portion extending outwardly from the other end of the arcuate portion, the second connecting portion comprises a connecting arm bending and extending from the main portion toward the magnetic circuit system and a supporting arm bending and extending outwardly from the connecting arm, a lower surface of the first connecting portion is fixedly connected with the supporting arm.

As an improvement, the arcuate portion extends recessed to the magnetic circuit system.

As an improvement, the voice coil is fixedly connected with a lower surface of the body portion.

As an improvement, the magnetic circuit system comprises a yoke connected with the frame, a main magnet and a secondary magnet connected with the yok, a main pole plate attached to the main magnet, and a secondary pole plate attached to the secondary magnet, the main magnet and is spaced apart from the secondary magnet, the secondary pole plate comprises a fixing post bending and extending to the suspension, the second connecting portion of the suspension is fixedly connected with the fixing post of the secondary pole plate.

As an improvement, the secondary pole plate comprises an avoiding portion recessed to a direction away from the diaphragm, a projection of the arcuate portion along a vibration direction of the diaphragm is at least partially located in the avoiding portion.

As an improvement, the first metal dome is an aluminum dome.

As an improvement, the second dome is an aluminum dome or a composite dome comprising an aluminum foil layer and a carbon fiber layer.

DESCRIPTION OF EMBODIMENTS

The technical solutions in embodiments of the present disclosure will be described clearly and completely below with reference to the accompanying drawings in the embodiments of the present disclosure.

Figure 1:
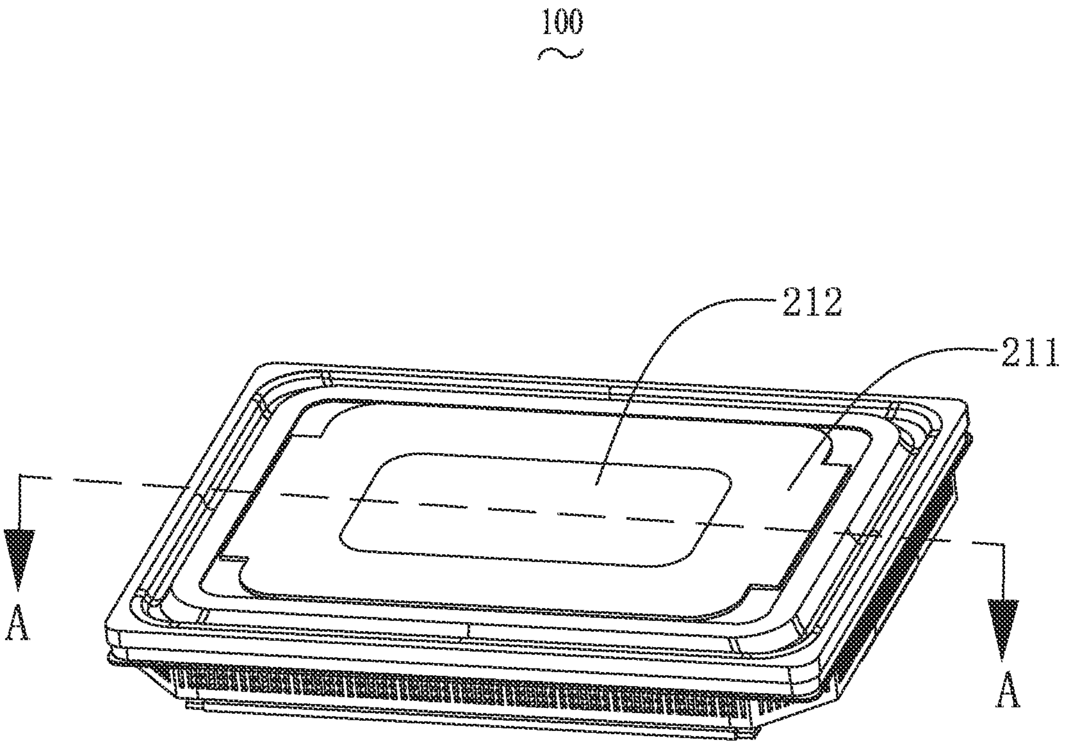
FIG. 1 is an isometric view of a speaker in accordance with an exemplary embodiment of the present disclosure.
Figure 2:
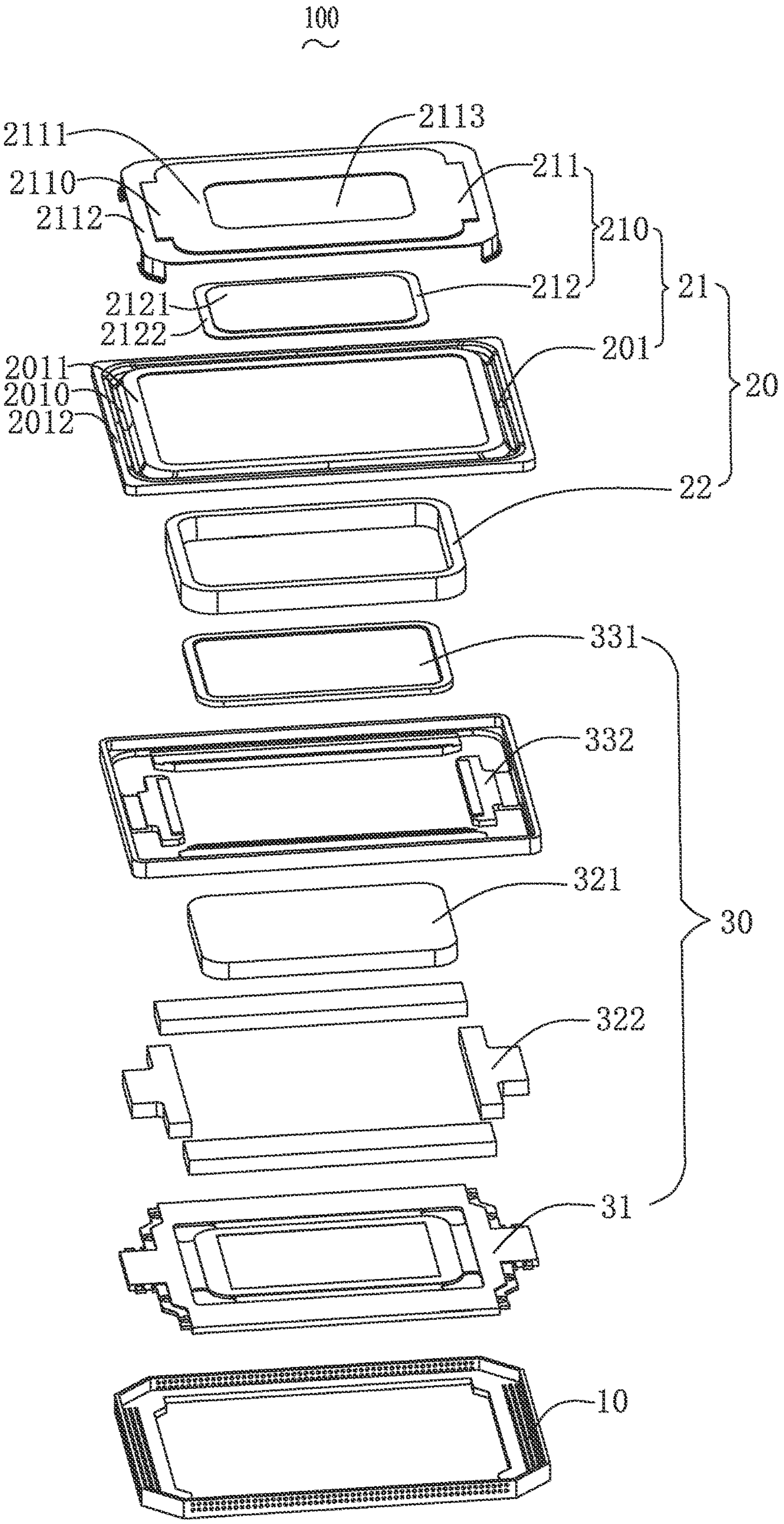
FIG. 2 is an exploded view of the speaker in FIG. 1.
Figure 3:
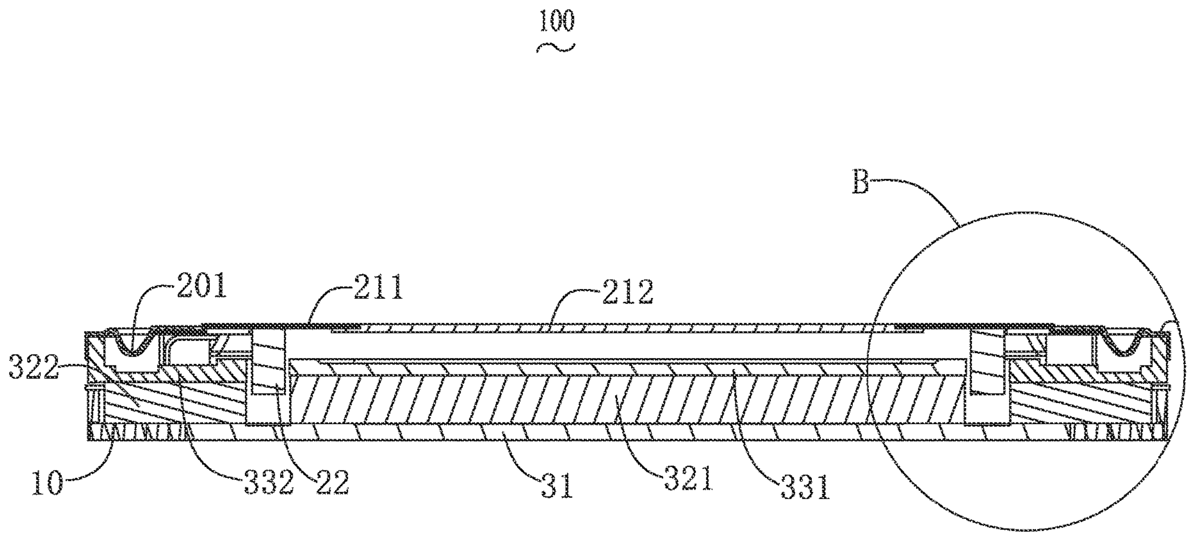
FIG. 3 is a cross-sectional view of the speaker taken along line A-A in FIG. 1.
Figure 4:
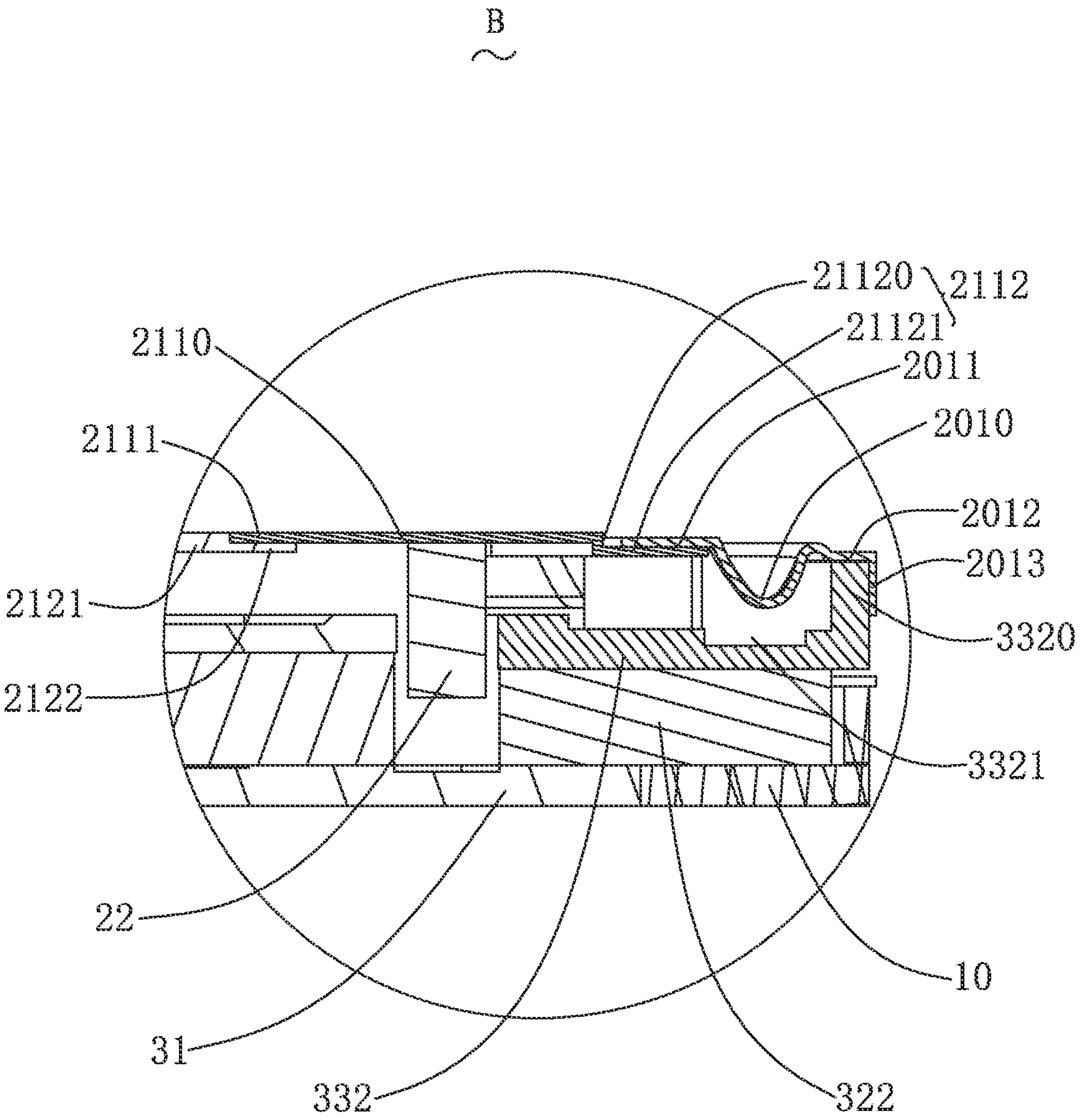
FIG. 4 is a partially enlarged view of a portion B shown in FIG. 3.

As shown in FIGS. 1-4, the present disclosure discloses a speaker 100. The speaker 100 includes a frame 10, and a vibration system 20 and a magnetic circuit system 30 fixed to the frame 10.

The vibration system 20 includes a diaphragm 21 fixed to the frame 10 and a voice coil 22 driving the diaphragm 21 to vibrate and emit sounds. The diaphragm 21 includes a dome 210 and a suspension 201 surrounding and connected with the dome 210, the dome 210 includes a first metal dome 211 with a through hole 2113 and a second dome 212 covering the through hole 2113, the first metal dome 211 is located between the suspension 201 and the second dome 212, and the first metal dome 211 is fixedly connected with the suspension 201 and the second dome 212. In addition, the first meal dome 211 is an aluminum dome or other metal dome which is easy to work with and is thin and light. The second dome 212 is an aluminum dome or a composite dome including an aluminum foil layer and a carbon fiber layer, which can improve the stiffness of the second dome 212 and the high frequency performance of the speaker 100, in other implementations, the second composite dome can also be formed by other materials composite.

The first metal dome 211 includes a main portion 2110, a first fixing portion 2111 connected with the second dome 212 and a second fixing portion 2112 connected with the suspension 201, the main portion 2110 is arranged between the first fixing portion 2111 and the second fixing portion 2112, the second dome 212 includes a body portion 2121 and a groove 2122 recessed from an outer edge of the body portion 2121 to the magnetic circuit system 30, the body portion 2121 is arranged in the through hole 2113, a lower surface of the first fixing portion 2111 is fixedly connected with the groove 2122. In the present application, an upper surface of the first fixing portion 2111 is flush with an upper surface of the body portion 2121, that is, the dome 210 is formed by the combination of the second dome 212 and the first metal dome 211, but the height of the speaker 100 does not increase, and an internal space of the speaker 100 is made full use of, the strength of the dome is enhance.

In addition, the suspension 201 includes an arcuate portion 2010, a first connecting portion 2011 extending inwardly from one end of the arcuate portion 2010, and a second connecting portion 2112 extending outwardly from the other end of the arcuate portion 2010, the second connecting portion 2112 includes a connecting arm 21120 bending and extending from the main portion 2110 toward the magnetic circuit system 30, and a supporting arm 21121 bending and extending outwardly the connecting arm 21120, a lower surface of the first connecting portion 2011 is fixedly connected with the supporting arm 21121. The arcuate portion 2010 concave and extending to the magnetic circuit system 30, which could reduction of an overall height of the speaker 100. In other embodiments, the arcuate portion 2010 may also project away from the magnetic circuit system 30.

The voice coil 22 is fixedly connected with a lower surface of the body portion 2110, the proximity of the voice coil 22 to the dome made of metal material allows for easy heat dissipation from the voice coil 22.

The magnetic circuit system 30 includes a yoke 31 connected with the frame 10, a main magnet 321 and a secondary magnet 322 connected with the yoke 31, a main pole plate 331 attached to the main magnet 321, and a secondary pole plate 332 attached to the secondary magnet 322, the main magnet 321 and is spaced apart from the secondary magnet 322, the secondary pole plate 332 includes a fixing post 3320 bending and extending towards the suspension 201, the second connecting portion 2012 of the suspension 201 is fixedly connected with the fixing post 3320 of the secondary pole plate 332. The suspension 201 further includes an extending portion 2013 bending from the second connecting portion 2012 toward the magnetic circuit system 30, the extending portion 2013 is fixedly connected with an outer surface of the fixing post 3320, thereby increasing the connection area between the suspension 201 and the fixing post 3320, improving the fixation strength of the suspension of the fixing post 3320. The secondary pole plate 332 includes an avoiding portion 3321 recessed to a direction away from the diaphragm 21, a projection of the arcuate portion 2010 along the vibration direction of the diaphragm 21 is at least partially located in the avoiding portion 3321, the avoiding portion 3321 may provide vibration space for the arcuate portion 2010.

The dome 210 in the present application is connected by the first metal dome 211 and the second dome 212, which not only makes the dome easy to shape and process, but also improves the strength and high frequency performance of the speaker. In addition, the second dome 212 is arranged in the through hole 2113 of the first metal dome 211, which can save the space of the speaker 100 and not increase the height of the speaker 100 by setting two domes.

The above descriptions are merely some of the embodiments of the present disclosure. It should be pointed out that for those of ordinary skill in the art, improvements can be made without departing from the inventive concept of the present disclosure, shall fall within the scope of the present disclosure.

What is claimed is:

1. A speaker, comprising:
a frame,
a vibration system fixed to the frame, comprising a diaphragm fixed to the frame and a voice coil driving the diaphragm to vibrate and emit sounds, and
a magnetic circuit system fixed to the frame, wherein
the diaphragm comprises a dome and a suspension surrounding and connected with the dome, the dome comprises a first metal dome with a through hole and a second dome covering the through hole, the first metal dome is located between the suspension and the second dome, the first metal dome comprises a main portion, a first fixing portion connected with the second dome and a second fixing portion connected with the suspension, the main portion is arranged between the first fixing portion and the second fixing portion, the second dome comprises a body portion and a groove recessed from an outer edge of the body portion toward the magnetic circuit system, the body portion is arranged in the through hole, a lower surface of the first fixing portion is fixedly connected with the groove.

2. The speaker described as claim 1, wherein an upper surface of the first fixing portion is flush with an upper surface of the body portion.

3. The speaker described as claim 1, wherein the suspension comprises an arcuate portion, a first connecting portion extending inwardly from one end of the arcuate portion, and a second connecting portion extending outwardly from the other end of the arcuate portion, the second connecting portion comprises a connecting arm bending and extending from the main portion toward the magnetic circuit system and a supporting arm bending and extending outwardly from the connecting arm, a lower surface of the first connecting portion is fixedly connected with the supporting arm.

4. The speaker described as claim 3, wherein the arcuate portion extends recessed to the magnetic circuit system.

5. The speaker described as claim 3, wherein the voice coil is fixedly connected with a lower surface of the body portion.

6. The speaker described as claim 3, wherein the magnetic circuit system comprises a yoke connected with the frame, a main magnet and a secondary magnet connected with the yok, a main pole plate attached to the main magnet, and a secondary pole plate attached to the secondary magnet, the main magnet and is spaced apart from the secondary magnet, the secondary pole plate comprises a fixing post bending and extending to the suspension, the second connecting portion of the suspension is fixedly connected with the fixing post of the secondary pole plate.

7. The speaker described as claim 6, wherein the secondary pole plate comprises an avoiding portion recessed to a direction away from the diaphragm, a projection of the arcuate portion along a vibration direction of the diaphragm is at least partially located in the avoiding portion.

8. The speaker described as claim 1, wherein the first metal dome is an aluminum dome.

9. The speaker described as claim 1, wherein the second dome is an aluminum dome or a composite dome comprising an aluminum foil layer and a carbon fiber layer.

* * * * *